United States Patent Office 3,422,146
Patented Jan. 14, 1969

3,422,146
PROCESS FOR THE DEHYDROGENATION OF CYCLOHEXANOL
Franz Defoor, Strombeek-Bever, Belgium, assignor to Institut Francais du Petrole des Carburants et Lubrifiants, Rueil-Malmaison, Hauts-de-Seine, France
No Drawing. Filed Sept. 30, 1966, Ser. No. 583,451
Claims priority, application France, Sept. 30, 1965, 33,359
U.S. Cl. 260—586         5 Claims
Int. Cl. C07c 43/30

ABSTRACT OF THE DISCLOSURE

In the liquid phase dehydrogenation of cyclohexanol to cyclohexanone, the improvement of starting the reaction with a mixture of cyclohexanol and cyclohexanone having a first weight ratio of cyclohexanone/cyclohexanone plus cyclohexanol of above 0.6 to about 0.99, preferably 0.65–0.90 for at least the first ten minutes, preferably from 1 to 10 hours, and then continuing the reaction by lowering said weight ratio to lower than 0.6, preferably to about 0.3–0.55.

---

The present invention relates generally to a process for dehydrogenating cyclohexanol to cyclohexanone and particularly to improve production of cyclohexanone by the liquid phase dehydrogenation of cyclohexanol having a dehydrogenation catalyst suspended therein.

The properties, uses and prior art methods of manufacturing cyclohexanol and cyclohexanone are disclosed in Kirk and Othmar, "Encyclopedia of Chemical Technology," 2nd edition, vol. 6, pp. 683–688.

In the prior art methods of dehydrogenating cyclohexanol, of which the present invention is an improvement, the catalyst is, for example, copper oxide, preferably mixed with chromium oxide or other supports. The catalyst is optionally mixed with other additives such as, for example, iron oxide, magnesium oxide, or other alkaline earth oxides, preferably barium oxide. It is also possible to use a catalyst treated, for example, with sodium borohydride.

The dehydrogenation reaction is generally performed at a temperature between 100 and 250° C., preferably between 180 and 220° C., and under a pressure of 0.1 to 50 atmospheres, preferably between 1 and 2.5 atm.

The dehydrogenation of cyclohexanol is an equilibrium reaction and in order to obtain a high yield of cyclohexanone it is necessary to allow for the liberation of hydrogen.

It is known in the prior art that an accumulation of cyclohexanone in the reaction mixture greatly reduces the activity of the catalyst. Therefore, it has been found necessary to draw off the cyclohexanone either directly from the liquid phase, or by condensation of the vapors entrained by the hydrogen. An acceptable reaction speed has been obtained by maintaining the ratio of cyclohexanone to cyclohexanol+cyclohexanone in the liquid phase at a maximum of 0.6, and preferably between 0.3 and 0.55. This particular prior art method is disclosed in U.S. patent to Coussemant No. 2,829,165 wherein no cyclohexanone is added at the beginning of the reaction.

The prior art methods have limitations and a particular difficulty is experienced at the beginning of the reaction. The cyclohexanol containing the catalyst in suspension produces foams which carry some of the catalyst into the subsequent fractionating circuits and prevent them from functioning. Because of the foam and catalyst carry-over, the process is not performed without interruption.

During this start-up period of the reaction, the yield of cyclohexanone from the conversion of cyclohexanol remains low.

It is therefore an object of the present invention to improve the yield of cyclohexanone resulting from the dehydrogenation of cyclohexanol.

Another object of the present invention is to shorten the time of conversion necessary to obtain an acceptable yield of cyclohexanone resulting from the dehydrogenation of cyclohexanol.

A particular object of the invention is the prevention of foam during the dehydrogenation of cyclohexanol containing a catalyst in suspension.

Still another particular object of the invention is an uninterrupted start-up period for the process of dehydrogenating cyclohexanol containing a catalyst in suspension.

Upon further study of the specification and claims, other objects and advantages of the present invention will become apparent.

According to the present invention, the prior art liquid phase methods of dehydrogenating cyclohexanol containing a catalyst in suspension, the disclosures of which are incorporated herein, are improved by using at the beginning of the conversion a weight ratio of cyclohexanone to cyclohexanol+cyclohexanone that is higher than the ratio which is maintained later. To accomplish this, cyclohexanone from an external source is added to the reaction zone. This initial weight ratio is generally maintained at above 0.6 up to about 0.99, with the preferred range being between about 0.65 and 0.9.

The initial weight ratio is maintained during a start-up time of at least ten minutes, and preferably between about 1 to 10 hours.

After the start-up time, the initial weight ratio is permitted to drop below the selected range for the normal evolution of the reaction. This lowering of the ratio is obtained, for example, by adding the necessary amount of cyclohexanol, or by removing the excess cyclohexanone by distillation. The reaction can then be carried out normally under known conditions for extended periods, depending on the type and amount of catalyst, usually at least for several hundred hours.

As contrasted with the prior art, the proportion of cyclohexanone in the present process is relatively high at the commencement of the reaction. As a result, the reaction velocity is initially slower than in the presence of cyclohexanol alone. This minor disadvantage is far outweighed by the advantages of (a) ease of operation, and (b) high molar yields. Furthermore, the reaction velocities attain their normal value when, after the start-up period of the reaction, the ratio of cyclohexanone to cyclohexanol+cyclohexanone is brought down to lower values.

The proportion of catalyst used is in the usual range, for example, between 5 and 40% by weight of the liquid phase. A specific embodiment of the catalyst has the following composition:

| | Percent by weight |
|---|---|
| $Cr_2O_3$ | 50 |
| CuO | 40 |
| BaO | 10 |

The present invention is not limited to this specific embodiment of the catalyst. Any other dehydrogenation catalyst suitable for the dehydrogenation of cyclohexanol in the particular temperature range selected is useful, as for example, a catalyst of nickel, silver, cobalt, platinum, or oxides of aluminum, chromium, molybdenum or zinc.

The dehydrogenation reaction is optionally conducted in the presence of an inert organic solvent, the volume percent of such solvent in the reaction milieu being preferably about 40 to 95. Examples of such solvents are:

Saturated paraffins or naphthenes having at least 10 carbon atoms, for example, decahydronaphthalene, hexadecane, tetradecahydroanthracene and $C_{10}$ to $C_{20}$ saturated hydrocarbon cuts.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example 1

This example is given for purposes of comparison and as an illustration of the prior art.

Into a reactor are introduced 1 kg. cyclohexanol and 0.25 kg. of a catalyst having the following composition:

| | Percent by weight |
|---|---|
| $Cr_2O_3$ | 50 |
| CuO | 40 |
| BaO | 10 |

The temperature is kept at 190° C. during operation of the reactor.

The pressure is maintained at 2 atm. The entrained vapors in the gaseous effluent are continually condensed; after the condensate is fractionally distilled, the cyclohexanol is recycled to the reaction zone, and the cyclohexanone is conducted to the storage tank. The volume of the liquid phase is maintained by the addition of fresh cyclohexanol.

The molar yield of cyclohexanone from conversion of the cyclohexanol varies as follows:

| Hours of operation: | Molar yield |
|---|---|
| 1 | 95.1 |
| 2 | 95.9 |
| 5 | 97.2 |
| 10 | 98.1 |
| 50 | 99 |

Example 2

Into a reactor are introduced o.25 kg. cyclohexanol and 0.75 kg. cyclohexanone (ratio by weight of cyclohexanone to cyclohexanol+cyclohexanone is 0.75) and also 0.25 kg. of the catalyst described in Example 1.

The process is performed at 190° C. and the temperature is kept constant during the reaction. The pressure is kept at 2 atm.

The condensed vapors are fractionated. The cyclohexanol is recycled and the cyclohexanone is conducted to the storage tank.

Fresh cyclohexanol is added in just sufficient amounts to progressively lower the above-mentioned ratio to 0.65 in two hours. Sufficient additional cyclohexanol is then added to bring the ratio down to 0.5. The operation is then continued with this ratio being kept constant.

Under these conditions, the operation is at no time inconvenienced by foams and the molar yields are as follows:

| Hours of operation: | Molar yield |
|---|---|
| 1 | 98.2 |
| 2 | 98.5 |
| 5 | 99 |
| 10 | 99.2 |
| 50 | 99.2 |

The same yields are obtained when the initial ratio of cyclohexanone to cyclohexanol+cyclohexanone is equal to 0.65 or to 0.9.

An identical yield is obtained if a value of 0.4 (instead of 0.5) is used for the ratio of cyclohexanone to cyclohexanol+cyclohexanone after the start-up of the operation.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

I claim:
1. In a process for producing cyclohexanone by the dehydrogenation of cyclohexanol in the liquid phase at about 100–250° C. and in the presence of a dehydrogenation catalyst suspended in the liquid phase, the improvement comprising:
   (a) starting the reaction with a mixture of cyclohexanol and cyclohexanone having a first weight ratio of cyclohexanone to cyclohexanone plus cyclohexanol, said first weight ratio being maintained at above 0.6 to about 0.99 for at least the first ten minutes, and
   (b) continuing the reaction with a second weight ratio of cyclohexanone to cyclohexanone plus cyclohexanol which is lower than 0.6.
2. The process of claim 1, wherein said second ratio is obtained by the addition of cyclohexanol to said mixture having the first ratio.
3. The process of claim 1, wherein said first ratio ranges between about 0.65 and 0.90 and said second ratio ranges between about 0.3 and 0.55.
4. The process of claim 1, wherein said first ratio is maintained for a time period of about 1 to 10 hours, and the second ratio is maintained till the end of the reaction.
5. The process of claim 3, wherein said first ratio is maintained for a time period of about 1 to 10 hours, and the second ratio is maintained till the end of the reaction.

References Cited

UNITED STATES PATENTS 2,829,165   4/1958   Coussemant _____ 260—596

LEON ZITVER, *Primary Examiner.*

M. JACOB, *Assistant Examiner.*